United States Patent
Bacardit et al.

(10) Patent No.: US 6,904,753 B2
(45) Date of Patent: Jun. 14, 2005

(54) SERVOBRAKE COMPRISING A REDUCED-REACTION MASTER CYLINDER

(75) Inventors: Juan Simon Bacardit, Barcelone (ES); Bruno Berthomieu, Barcelone (ES); Fernando Sacristan, Barcelone (FR)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 10/664,139

(22) Filed: Sep. 17, 2003

(65) Prior Publication Data

US 2004/0069582 A1 Apr. 15, 2004

(51) Int. Cl.$^7$ .............................................. B60T 13/20
(52) U.S. Cl. ...................................................... 60/553
(58) Field of Search .................................. 60/553, 552

(56) References Cited

U.S. PATENT DOCUMENTS 6,079,208 A * 6/2000 Verbo et al. .................. 60/553
6,195,993 B1 * 3/2001 Leboisne et al. ............. 60/553
6,195,994 B1 * 3/2001 Bacardit ....................... 60/553

* cited by examiner

*Primary Examiner*—Edward K. Look
*Assistant Examiner*—Michael Leslie
(74) *Attorney, Agent, or Firm*—Leo H McCoemick, Jr.

(57) ABSTRACT

A servobrake (10) including a pneumatic brake booster (12) and a master cylinder (22) with a main piston (20) that slides in a front pressure chamber (24). The main piston (20) has a fixed first rear end (46) acted on by a pneumatic piston (16) of the booster (12) and a moving second rear end (48) acted on by a feeler (18) of the booster (12) that is a coaxial with the piston (16) and acts upon a reaction ram (52) to communicate pressure forces in a front pressure chamber (24) of the master cylinder to the second end (48). A hydraulic isolation valve shutter (58), independent of the internal piston (50) of the ram (52), is activated when the input force of the booster (12) exceeds a given rate threshold so that the braking force is not reduced.

13 Claims, 3 Drawing Sheets

SERVOBRAKE COMPRISING A REDUCED-REACTION MASTER CYLINDER

The invention relates to a servobrake for a motor vehicle comprising a hydraulic brake master cylinder of the "reduced-reaction" type. A master cylinder such as this is intended in particular, when a booster actuating rod is actuated with a given intensity, to transmit only a reduced reaction to said actuating rod so that the driver does not inadvisably relax his braking effort.

The invention relates more particularly to a servobrake for a motor vehicle, of the type comprising a pneumatic brake booster a control rod of which is able, in response to an input force, to indirectly control a pneumatic piston and/or directly control a feeler coaxial with the pneumatic piston, which pneumatic piston and feeler are intended to act upon a main piston of a hydraulic brake master cylinder, of the type in which the main piston is mounted to slide inside a roughly axial bore of a body of the master cylinder between a rear position of rest and a forward position of applying a braking force, of the type in which the main piston is elastically returned toward its rear position of rest, of the type in which at least one sealing means is interposed between the main piston and the bore to delimit, within the bore, a rear supply chamber supplying hydraulic fluid and a front pressure chamber, of the type in which the main piston comprises at least one main valve shutter which can move between an open position, corresponding to the rear position of rest of the main piston, whereby the main valve shutter places the rear supply chamber and the front pressure chamber in communication, and a pressurizing position, corresponding to the forward position of application of the main piston, whereby the main valve shutter interrupts the communication between the rear supply chamber and the front pressure chamber to allow a hydraulic braking pressure to build up in the front pressure chamber, of the type in which the main piston comprises:

- a first rear end, secured to the main piston, which is intended to be actuated by the pneumatic piston of the booster;
- a second rear end, which is intended to be actuated by the feeler coaxial with the piston and which is secured to a piston known as a reaction piston of a ram which is housed in the main piston, which ram comprises a chamber known as a reaction chamber able to be placed in communication with the front pressure chamber of the master cylinder to transmit, to the second rear end, the resultant reaction of the pressure forces in the front pressure chamber; and
- isolation means, controlled by the advance of the second rear end when the input force of the booster exceeds a given force threshold, which are able to isolate the reaction chamber of the ram from the front pressure chamber so that the resultant reaction of the pressure forces in the front pressure chamber is not transmitted to the second end.

Numerous exemplary embodiments of servobrakes of this type are known. In particular, it is known practice to offer a servobrake of the type described hereinabove, in which the isolation means consist of a front seat formed at the front of the ram reaction piston and able to come into contact with a complementary seat formed at the end of the reaction chamber of the said ram to interrupt the communication between the front pressure chamber and the reaction chamber.

This design entails producing a reaction piston which is very closely guided in sliding so that its application against the complementary seat is able to guarantee a perfect seal. As a result, such isolation means have a high cost of manufacture.

Furthermore, closure of the isolation means can be accomplished only when the reaction piston has travelled a great distance, thus entailing producing a ram of relatively large axial bulk.

The invention proposes to remedy these disadvantages by proposing isolation means that are independent of the reaction piston.

To this end, the invention proposes a servobrake of the type described hereinabove, characterized in that the isolation means comprise:

- a hydraulic isolation valve shutter which is interposed between the reaction chamber of the ram and the front pressure chamber and which is independent of the reaction piston of the ram; and
- flow restricting means, interposed between the hydraulic isolation valve shutter and the front pressure chamber, in order, when the pressure in the reaction chamber of the ram exceeds a given pressure threshold associated with the exceeding of the given rate threshold, to close the hydraulic isolation valve shutter so as to interrupt the communication between the reaction chamber of the ram and the front pressure chamber.

According to other features of the invention:

- the isolation valve shutter is arranged inside the cylindrical and axial reaction chamber of the ram;
- the flow restricting means comprise a front communication duct of a diameter smaller than that of the reaction chamber, which communicates with the front pressure chamber, and the isolation valve shutter comprises at least:
- an isolation piston, of a diameter roughly equal to that of the reaction chamber of the ram, which is guided in sliding in the reaction chamber of the ram by axial guide means and which is returned elastically rearward; and
- an isolation seat, which is formed at the transverse front end of the reaction chamber and into which the front axial communication duct opens. In order to allow the isolation piston to be kept away from the isolation seat when the pressure in the chamber of the ram is below the given pressure threshold and in order, when the pressure in the chamber of the ram exceeds the given pressure threshold associated with the exceeding of the given rate threshold, and because of the flow restriction created by the front communication duct, to create a depression in the front communication duct to press the isolation piston firmly into contact with the isolation seat so as to shut off the front communication duct. The front communication duct has an axial cylindrical first part which opens into the reaction chamber of the ram and a roughly radial second part that opens into the axial first part to communicate with the front pressure chamber. The means for axial guidance of the isolation piston comprise a rod that is secured to the isolation piston, a first section of which passes with clearance through the axial cylindrical first part of the communication duct and a second section of which is mounted to slide in an axial guide bore of the main piston which is arranged coaxially in front of the axial cylindrical first part of the communication duct. The second part of the front communication duct opens into a peripheral intermediate chamber of the main piston which communicates with the front pressure chamber.

The servobrake comprises means for immobilizing the valve shutter in its position in which it shuts off the communication duct.

The immobilizing means comprise means that can be expanded radially into contact with the guide rod of the isolation piston, which means are activated when the pressure in the peripheral intermediate chamber corresponds to the hydraulic braking pressure in the front pressure chamber.

The expandable means comprise at least one elastic immobilization cup which is mounted in a radial drilling arranged between the peripheral intermediate chamber and the axial guide bore for guiding the isolation piston and which is able, when the pressure in the peripheral intermediate chamber corresponds to the hydraulic braking pressure in the front pressure chamber, to deform radially inward to come into contact with the guide rod of the isolation piston.

The expandable means comprise at least one radial immobilizing piston mounted to slide in a radial drilling arranged between the peripheral intermediate chamber and the axial guide bore for guiding the isolation piston, against the action of return means, and which is able, when the pressure in the peripheral intermediate chamber corresponds to the hydraulic braking pressure in the front pressure chamber, to come into contact with the guide rod of the isolation piston.

The elastic return means for returning the isolation piston comprise a compression spring mounted in a return chamber coaxial with the peripheral intermediate chamber, one end of which spring bears against the body of the main piston and the other end of which spring bears against one end of the guide rod of the isolation piston projecting from the associated guide bore.

The ram, the isolation valve shutter of the ram, the communication duct, the means for immobilizing the valve shutter and the return chamber are arranged in a tubular element which is housed in a rear bore of the tubular main piston, the tubular element and the rear bore delimit the peripheral intermediate chamber, and the rear bore is closed by the first rear end which forms a stopper, a drilling of which has the second rear end passing coaxially through it. The main valve shutter is a valve shutter of coaxial type interposed between the front pressure chamber and the rear supply chamber.

Other characteristics and advantages of the invention will become apparent from reading the detailed description which follows, for an understanding of which reference will be made to the attached drawings.

In the description which follows, identical reference symbols denote parts which are identical or have similar functions.

By convention, the terms "front" and "rear" respectively denote elements or positions directed respectively toward the left and toward the right in the figures.

Figure 1:
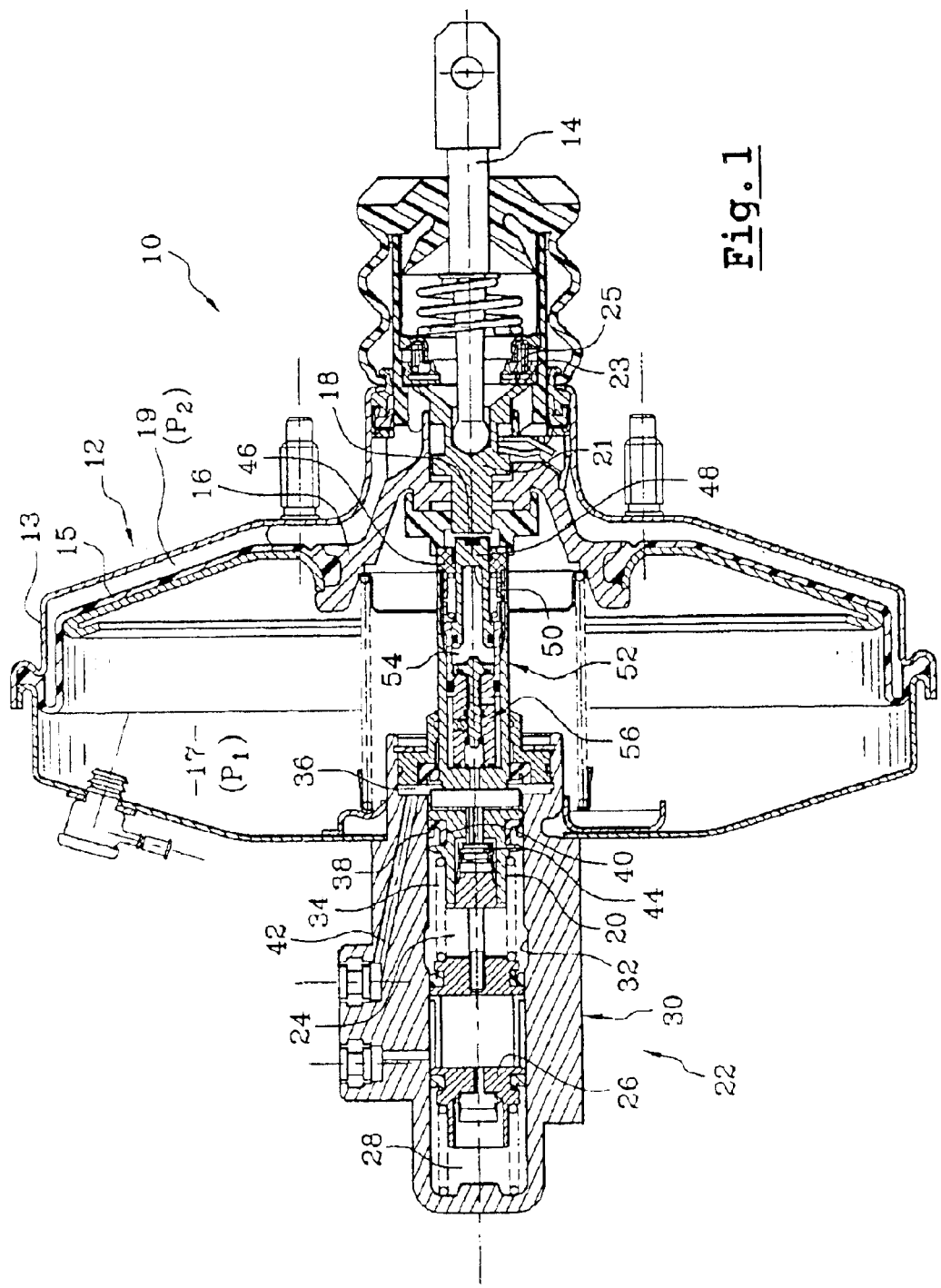
FIG. 1 is a view in axial section of a servobrake according to the invention.

FIG. 1 depicts the entirety of a servobrake 10 produced according to the invention and intended for a motor vehicle.

In a known way, the servobrake 10 comprises a pneumatic brake booster 12 a control rod 14 of which is able, in response to an input force, to indirectly control a pneumatic piston 16 and/or directly control a feeler 18 coaxial with the pneumatic piston 16. The principle of operation of such a booster 12 will be described more explicitly in the remainder of this description.

The pneumatic piston 16 and the feeler 18 are intended to act upon a main piston 20 of a hydraulic brake master cylinder 22. In particular, the master cylinder 22 is a master cylinder of the "tandem" type known from the prior art, the main piston 20 of which constitutes the primary piston intended to establish a braking pressure in a primary front pressure chamber 24 to supply a primary brake circuit (not depicted), and which comprises a secondary piston 26 intended to establish a braking pressure in a secondary rear front pressure chamber 28 to supply a secondary brake circuit (not depicted).

In what follows of the present description, reference will be made only to the primary main piston 20 which will be termed the main piston 20, and to the primary front pressure chamber 24 which will be termed the front pressure chamber 24.

In a known way, the main piston 20 is mounted to slide inside a roughly axial bore 32 of a body 30 of the master cylinder 22 between a rear position of rest, depicted in FIG. 1, and a forward position of applying a braking force (this position is not depicted). The main piston 20 is elastically returned toward its rear position of rest by a compression spring 34.

At least one sealing means is interposed between the main piston 20 and the bore 32 to delimit, within the bore 32, a rear supply chamber 36 supplying hydraulic fluid and the front pressure chamber 24. In the preferred embodiments of the invention, the sealing means consists of a lip seal 38 housed in a groove 40 of the main piston 20 and the rear supply chamber 36 for supplying hydraulic fluid is supplied with hydraulic fluid via a duct 42 which is intended to open into a reservoir (not depicted) of hydraulic fluid of the master cylinder 22.

The main piston 20 comprises at least one main valve shutter 44 which can move between an open position, corresponding to the rear position of rest of the main piston 20, and whereby the main valve shutter places the rear supply chamber 36 and the front pressure chamber 24 in communication, and a pressurizing position, corresponding to the forward position of application of the main piston, and whereby the main valve shutter interrupts the communication between the rear supply chamber 36 and the front pressure chamber 24 to allow a hydraulic braking pressure to build up in the front pressure chamber 24.

In a known way, the main piston 20 comprises a first rear end 46, secured in terms of movement to the main piston 20, of which an annular rear face, of a diameter roughly equal to that of the main piston 20, is intended to be actuated by the pneumatic piston 16 of the booster 12.

The main piston 20 also comprises a second rear end 48, roughly coaxial with the first rear end 46, of which a disk-shaped rear face is intended to be acted upon by the feeler 18 which is coaxial with the piston 16.

The second rear end 48 is secured to a piston 50 known as a reaction piston of a ram 52 which is housed in the main piston 20. The ram 52 comprises a chamber 54 known as a reaction chamber able to be placed in communication with the front pressure chamber 24 of the master cylinder 22 to transmit, to the second rear end 48, the resultant reaction of the pressure forces in the front pressure chamber 24.

In a known way, the main piston 20 comprises isolation means 56 which are able, in response to the advance of the second rear end 48 with respect to the first rear end 46 which occurs when the input force is exerted on the control rod 14 of the booster 12 above a given rate threshold, to isolate the reaction chamber 54 of the ram from the front pressure chamber 24 such that the resultant reaction of the pressure forces in the front pressure chamber 24 is not transmitted to the second rear end 48.

More particularly, the isolation means are activated by the feeler 18 covering a given travel with respect to the pneumatic piston 16. This travel is covered by the feeler 18 only when the input force of the booster 12 is exerted above a given rate threshold for which, because of the delay in balancing the pressures in the chambers of the booster 12, the feeler 18 moves faster than does the feeler 18.

What actually happens, in a known way, is that the booster 12 has a rigid envelope 13 inside which there moves a transverse partition 15 delimiting, in a sealed manner, a front chamber 17, subjected to a first pressure $P_1$, and a rear chamber 19, subjected to a second pressure $P_2$ that varies between the pressure $P_1$ and a pressure higher than the pressure $P_1$. The moving piston 16 is secured to the moving partition 15 and accommodates a plunger 21 which accommodates the control rod 14 and at the end of which the feeler 18 is formed. The plunger 21 has an annular rear seat 23 for a three-way valve shutter 25, which is able to vary the second pressure in the rear chamber. When the input force exerted on the rod 14 exceeds a given force threshold, the feeler 16, driven directly by the rod 14, reacts to the actuation of the actuating rod 14 faster than does the membrane 15 of the booster 12, because of the delay in the balancing of the pressures between the front chamber 17 and the rear chamber 19. As a result, at the start of actuation of the rod 14 beyond the given rate threshold, the feeler 16 advances by a given travel with respect to the piston 16. The covering of this given amount of travel determines the actuation of the isolation means 56.

In a conventional servobrake, the isolation means consist of a front seat which is formed at the front of the ram reaction piston and is able, when the piston has been urged by the feeler to cover the given travel, to come into contact with a complementary seat formed at the end of the reaction chamber of said ram to interrupt the communication between the front pressure chamber and the reaction chamber.

This design entails the producing of a reaction piston which is strictly guided in its sliding so that its application against the complementary seat guarantees the perfect seal. As a result, such isolation means have a high cost of manufacture. Furthermore, the travel of the reaction piston leads to the producing of a main piston that has to be bulky.

As illustrated by FIGS. 2 to 5, in order to remedy these disadvantages, the invention proposes isolation means 56 which are independent of the reaction piston 50.

According to the invention, the isolation means comprise:

a hydraulic isolation valve shutter 58 which is interposed between the reaction chamber 54 of the ram 52 and the front pressure chamber 24 and which is independent of the reaction piston 50 of the ram, and flow restricting means, interposed between the hydraulic isolation valve shutter 58 and the front pressure chamber 24. In order, when the pressure in the chamber 54 of the ram 52 exceeds a given pressure threshold associated with the exceeding of the given rate threshold, to close the hydraulic isolation valve shutter 58 and thus interrupt the communication between the reaction chamber 54 of the ram and the front pressure chamber 24.

According to the invention, the flow restricting means comprise a front communication duct 60 of a diameter smaller than that of the reaction chamber 54 to form a flow restriction and which communicates with the front pressure chamber 24.

More particularly, this front communication duct 60 has an axial cylindrical first part 62 which opens into the reaction chamber 54 of the ram 52 and a roughly radial second part 64 which opens at one of its ends into the axial first part 62 and which communicates with the front pressure chamber.

The other end of the roughly radial second part 64 of the front communication duct 60 opens into a peripheral intermediate chamber 66 of the main piston 20 which itself communicates with the front pressure chamber via a duct 68 arranged in the thickness of the main piston 20. FIGS. 2 to 5 disclose an orifice 70 of one end of this duct 68 which opens into the peripheral intermediate chamber 66 and the orifice 72 of the other end of this duct 68 which opens into the radial piston 20 forward of the main valve shutter 44, and therefore into the front pressure chamber 24.

The isolation valve shutter 58 is arranged in the reaction chamber 54 of the ram 52 which is roughly cylindrical and axial and it comprises at least one isolation piston 74, of a diameter roughly equal to that of the reaction chamber 54 of the ram 52, which is guided in sliding in the reaction chamber 54 of the ram by axial-guidance means and which is returned elastically rearward.

The isolation valve shutter 58 also comprises an isolation seat 76, which is formed at the front transverse end 78 of the reaction chamber 54 and into which the axial cylindrical part 62 of the front communication duct 60 opens.

This configuration makes it possible to keep the isolation piston 74 away from the isolation seat 76 when the pressure in the chamber 54 of the ram 52 is below the given pressure threshold.

Conversely, this configuration also makes it possible, when the pressure in the chamber 54 of the ram 52 exceeds the given pressure threshold associated with the exceeding of the given rate threshold, and because of the flow restriction created by the front communication duct 60, to create a depression in the front communication duct 60 to press the isolation piston 74 firmly into contact with the isolation seat 76 so as to shut off the axial cylindrical part 62 of the front communication duct 60.

More specifically, the means for axial guidance of the isolation piston 74 comprise a rod 80, secured to the isolation piston 74, a first section 82 of which passes with clearance through the axial cylindrical first part 62 of the communication duct 60 and a second section 84 of which is mounted to slide in an axial guide bore 86 of the main piston which is arranged coaxially in front of the axial cylindrical first part 62 of the communication duct 60.

The elastic return means for returning the isolation piston 74 comprise a compression spring 88 mounted in a return chamber 90 coaxial with the peripheral intermediate chamber 66, one end of which spring bears against the body of the main piston 20 and the other end of which spring bears, via a washer 94, against one end 92 of the guide rod 80 of the isolation piston projecting from the associated guide bore 86.

Thus, when the input force is applied to the control rod 14 of the booster 12 with a force at a rate equal to or above the given rate, the feeler 18 advances more quickly than does the moving piston 16. As a result, the feeler 18 acts upon the second end 48 of the main piston 20, which pushes back the reaction piston 50 of the ram 52.

Figure 2:
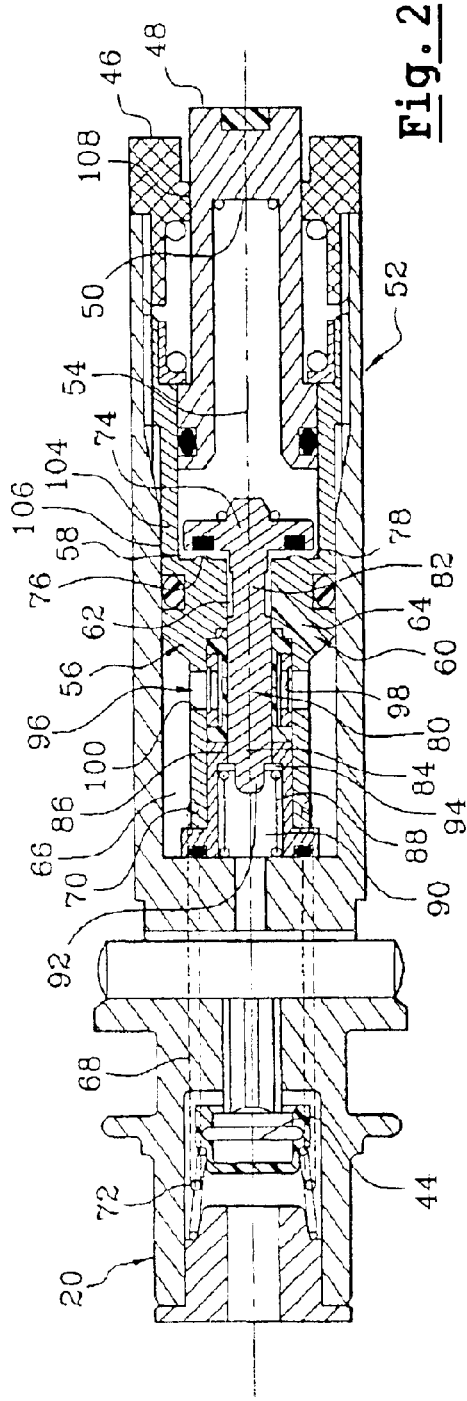
FIG. 2 is a detailed view in axial section of a first embodiment of a master cylinder associated with the servobrake of FIG. 1 depicted in a position in which the isolation means are open.
Figure 4:
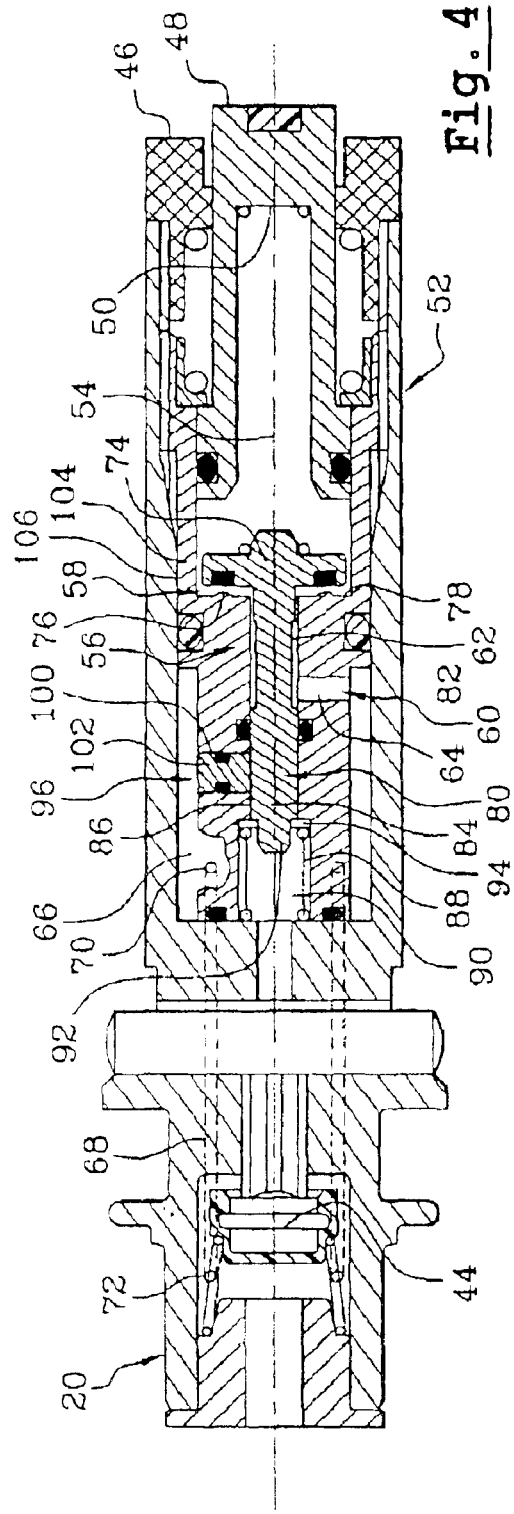
FIG. 4 is a detailed view in axial section of a second embodiment of a master cylinder associated with the servobrake of FIG. 1 depicted in a position in which the isolation means are open.

Because of the flow restriction formed by the first section 82 of the guide rod 80 of the isolation piston 74 in the front duct 60, a depression is created in the duct 60 in front of the isolation piston 74, which finds itself unbalanced and, when the force it experiences overcomes the opposing force of the spring 88, the isolation piston 74 is pressed firmly against its seat 76, this having the effect of isolating the reaction chamber 54 of the ram 52 as depicted in FIGS. 2 and 4. The reaction of the front pressure chamber is therefore no longer transmitted to the feeler 18.

Figure 5:
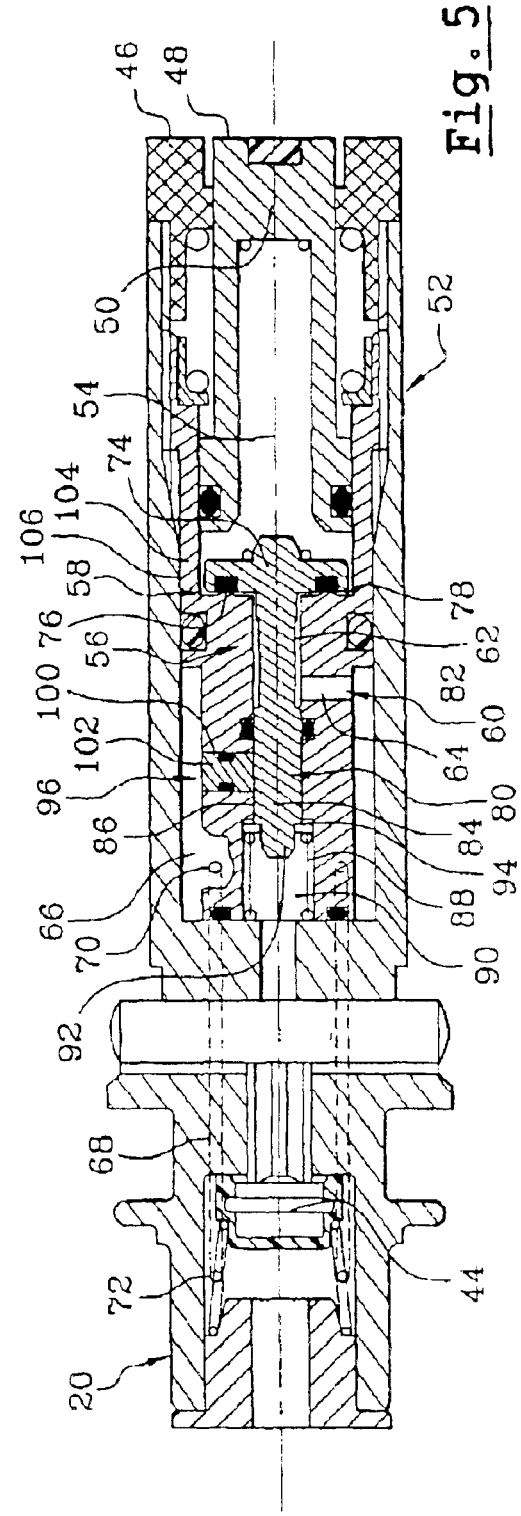
FIG. 5 is a detailed view of the master cylinder of FIG. 4 depicted in a position in which the isolation means are closed.

When the input force decreases, the feeler 18 retreats, and this has the effect of reducing the pressure in the reaction chamber 54 of the ram 52. The piston 74 then moves away from its seat 76 and the reaction of the front pressure chamber is once again transmitted to the feeler 18, as depicted in FIGS. 3 and 5.

The servobrake 10 comprises immobilizing means intended to keep the isolation valve shutter 58 in its position in which it shuts off the communication duct as long as the input force is not relaxed. These means are intended to keep the valve shutter 58 in its closed position to allow the reaction chamber 54 of the ram 52 to be perfectly isolated.

More particularly, the immobilizing means comprise means 96 that can be expanded radially into contact with the guide rod 80 of the isolation piston 74. These expandable means 96 are activated when the pressure in the peripheral intermediate chamber 66 corresponds to the hydraulic braking pressure in the front pressure chamber 24.

Figure 3:
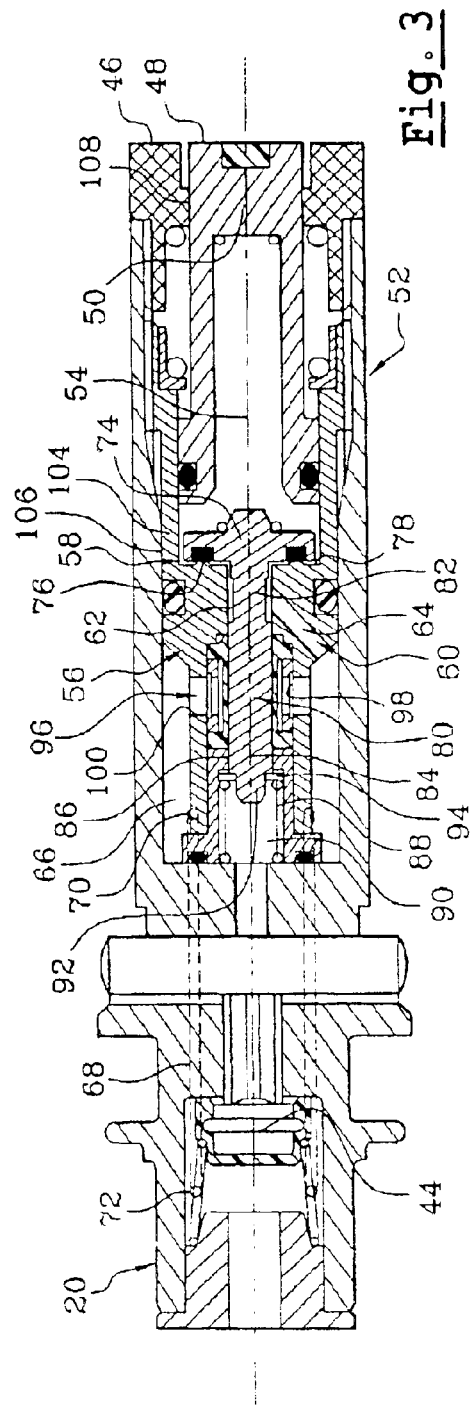
FIG. 3 is a detailed view of the master cylinder of FIG. 2, depicted in a position in which the isolation means are closed.

According to a first embodiment of the invention, which embodiment is depicted in FIGS. 2 and 3, the expandable means 96 comprise at least one elastic immobilization cup 98 which is mounted in a radial drilling 100 arranged between the peripheral intermediate chamber 66 and the axial guide bore 86 for guiding the isolation piston 74. This cup 98 is able to deform radially inward to come into contact with the guide rod 80 of the isolation piston 74 when the pressure in the peripheral intermediate chamber 66, which is equal to the pressure of the front pressure chamber 24, corresponds to the hydraulic braking pressure.

According to a second embodiment of the invention, which embodiment is depicted in FIGS. 4 and 5, the expandable means 96 comprise at least one radial immobilizing piston 102 mounted to slide in the radial drilling 100 against the action of return means (not depicted). This piston 102 is able to come into contact with the guide rod 80 of the isolation piston when the pressure in the peripheral intermediate chamber 66, which is equal to the pressure in the front pressure chamber, corresponds to the hydraulic braking pressure.

Advantageously, the main piston is produced in a way that is intended to be able to be assembled easily. For this, the ram 52, the isolation valve shutter 58 of the ram 52, the communication duct 60, the means 96 for immobilizing the valve shutter and the return chamber 54 are arranged in a tubular element 104 which is housed in a rear bore 106 of the tubular main piston 20. The tubular element 104 and the rear bore 106 delimit the peripheral intermediate chamber 66.

In additon, the rear bore 104 is closed by the first rear end 46 which forms a stopper, a drilling 108 of which has the second rear end 48 passing coaxially through it.

Finally, it should be pointed out that, in the preferred embodiments of the invention, the main valve shutter 44 is a valve shutter of coaxial type interposed between the front pressure chamber 24 and the rear supply chamber 36.

This arrangement obviously does not limit the invention and any other type of main valve shutter 44 could be used to embody the invention, such as, for example, a valve shutter of the ported type, of a type known from the prior art.

The invention therefore makes it possible to provide a servobrake for which the reaction of the brake circuit is not transmitted to the actuation rod 14 when a braking force is applied at a rate above or equal to a given rate threshold corresponding to an emergency braking situation, something that makes it possible to avoid the driver of the vehicle inadvisably relaxing his braking effort and thus makes it possible to ensure maximum braking force under all circumstances.

We claim:

1. A servobrake (10) for a motor vehicle including a pneumatic brake booster (12) with a control rod (14) responsive to an input force to indirectly control a pneumatic piston (16) and/or directly control a feeler (18) coaxial with the pneumatic piston (16) in which said pneumatic piston (16) and feeler (18) act upon a main piston (20) of a hydraulic brake master cylinder (22), said master piston having a main piston (20) that is mounted to slide inside a roughly axial bore (32) of a body (30) of the master cylinder (22) between a rear position of rest and a forward position of applying a braking force, said main piston (20) being elastically returned toward its rear position of rest, said master cylinder having at least one sealing means (38) interposed between the main piston (20) and the bore (32) to delimit, within the bore (32), a rear supply chamber (36) supplying hydraulic fluid and a front pressure chamber (24) in which the main piston (20) includes at least one main valve shutter (44) that moves between an open position, corresponding to the rear position of rest of the main piston (20), whereby the main valve shutter (44) places the rear supply chamber (36) and the front pressure chamber (24) in communication, and a pressurizing position, corresponding to the forward position of application of the main piston (20), whereby the main valve shutter (44) interrupts the communication between the rear supply chamber (36) and the front pressure chamber (24) to allow a hydraulic braking pressure to build up in the front pressure chamber (24), said main piston (20) comprises:

a first rear end (46), secured to the main piston (20) and actuated by the pneumatic piston (16) of the booster (12), a second rear end (48) actuated by the feeler (18) coaxial with the piston (16) and which is secured to a piston (50) known as a reaction piston of a ram (52) which is housed in the main piston (20), said ram (52) comprises a chamber (54) known as a reaction chamber able to be placed in communication with the front pressure chamber (24) of the master cylinder to transmit, to the second rear end (48), the resultant reaction of the pressure forces in the front pressure chamber (24), isolation means interposed between the reaction chamber (54) of the ram (52) and the front pressure chamber (24), and in response to the advance of the second rear end (48) with respect to the first rear end (46) when the input force exerted on the control rod (14) of the booster (12) exceeds a given rate threshold, to isolate the reaction chamber (54) of the ram (52) from the front pressure chamber (24) such that the resultant reaction of the pressure forces in the front pressure chamber (24) is not transmitted to the second rear end (48), characterized in that the isolation means comprise:

a hydraulic isolation valve shutter (58) interposed between the reaction chamber (54) of the ram (52) and the front pressure chamber (24) and which is independent of the reaction piston (50) of the ram (52); and flow restricting means, interposed between the hydraulic isolation valve shutter (58) and the front pressure chamber (24), in order, when the pressure in the reaction chamber (54) of the ram (52) exceeds a given pressure threshold associated with the exceeding of the given rate threshold, to close the hydraulic isolation valve shutter (58) so as to interrupt the communication between the reaction chamber (54) of the ram and the front pressure chamber (24).

2. The servobrake (10) according to claim 1, characterized in that the isolation valve shutter (58) is arranged inside the cylindrical and axial reaction chamber (54) of the ram (52).

3. The servobrake (10) according to claim 2, characterized in that the flow restricting means comprise a front communication duct (60) of a diameter smaller than that of the reaction chamber (54), which communicates with the front pressure chamber (24), and in that the isolation valve shutter (58) comprises at least:

an isolation piston (74), of a diameter roughly equal to that of the reaction chamber (54) of the ram (52), which is guided in sliding in the reaction chamber (54) of the ram (52) by axial guide means and which is returned elastically rearward, an isolation seat (76), which is formed at the transverse front end (78) of the reaction chamber (54) and into which the front axial communication duct (60) opens, in order to allow the isolation piston (74) to be kept away from the isolation seat (76) when the pressure in the chamber (54) of the ram (52) is below the given pressure threshold and in order, when the pressure in the chamber (54) of the ram (52) exceeds the given pressure threshold associated with the exceeding of the given rate threshold, and because of the flow restriction created by the front communication duct (60), to create a depression in the front communication duct (60) to press the isolation piston (74) firmly into contact with the isolation seat (76) so as to shut off the front communication duct (60).

4. The servobrake (10) according to claim 3, characterized in that the front communication duct (60) has an axial cylindrical first part (62) which opens into the reaction chamber (54) of the ram (52) and a roughly radial second part (64) which opens into the axial first part (62) and which communicates with the front pressure chamber (24).

5. The servobrake (10) according to claim 4, characterized in that the means for axial guidance of the isolation piston (74) comprise a rod (80), secured to the isolation piston, a first section (82) of which passes with clearance through the axial cylindrical first part (62) of the communication duct and a second section (84) of which is mounted to slide in an axial guide bore (86) of the main piston (74) which is arranged coaxially in front of the axial cylindrical first part (62) of the communication duct (60).

6. The servobrake (10) according to claim 5, characterized in that the second part (64) of the front communication duct opens into a peripheral intermediate chamber (66) of the main piston (20) which communicates with the front pressure chamber (24).

7. The servobrake (10) according to claim 6, further including means for immobilizing the valve shutter (58) in its position in which it shuts off the communication duct (60).

8. The servobrake (10) according to claim 7, characterized in that the immobilizing means comprise means (96) that can be expanded radially into contact with the guide rod (80) of the isolation piston (74), which means are activated when the pressure in the peripheral intermediate chamber (66) corresponds to the hydraulic braking pressure in the front pressure chamber (24).

9. The servobrake (10) according to claim 8, characterized in that the expandable means (96) comprise at least one elastic immobilization cup (98) which is mounted in a radial drilling (100) arranged between the peripheral intermediate chamber and the axial guide bore (86) for guiding the isolation piston (74) and which is able, when the pressure in the peripheral intermediate chamber (66) corresponds to the hydraulic braking pressure in the front pressure chamber (24), to deform radially inward to come into contact with the guide rod (80) of the isolation piston (74).

10. The servobrake (10) according to claim 8, characterized in that the expandable means comprise at least one radial immobilizing piston (102) mounted to slide in a radial drilling (100) arranged between the peripheral intermediate chamber (66) and the axial guide bore (86) for guiding the isolation piston (74), against the action of return means, and which is able, when the pressure in the peripheral intermediate chamber (66) corresponds to the hydraulic braking pressure in the front pressure chamber (24), to come into contact with the guide rod (80) of the isolation piston (74).

11. The servobrake (10) according claim 10, characterized in that the elastic return means for returning the isolation piston (74) comprise a compression spring (88) mounted in a return chamber (90) coaxial with the peripheral intermediate chamber, one end of which spring bears against the body of the main piston (20) and the other end of which spring bears against one end (92) of the guide rod (80) of the isolation piston (74) projecting from the associated guide bore (86).

12. The servobrake (10) according to claim 11, characterized in that the ram (52), the isolation valve shutter (58) of the ram, the communication duct (60), the means for immobilizing the valve shutter (58) and the return chamber (90) are arranged in a tubular element (104) which is housed in a rear bore (106) of the tubular main piston (20), in that the tubular element (104) and the rear bore (106) delimit the peripheral intermediate chamber (66), and in that the rear bore (106) is closed by the first rear end (46) which forms a stopper, a drilling (108) of which has the second rear end (48) passing coaxially through it.

13. The servobrake (10) according to claim 12, characterized in that the main valve shutter (44) is a valve shutter of coaxial type interposed between the front pressure chamber (24) and the rear supply chamber (36).

* * * * *